C. E. STEINWEG.
MEANS FOR SOLDERING ALUMINIUM.
APPLICATION FILED FEB. 9, 1909.
1,052,761.
Patented Feb. 11, 1913.
Fig.1. Fig.1ᴬ.   Fig.2. Fig.2ᴬ.   Fig.3. Fig.3ᴬ.
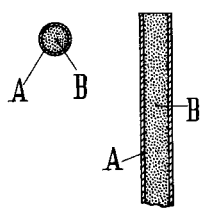 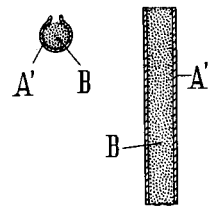 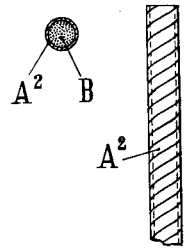
Fig.4. Fig.4ᴬ.   Fig.5. Fig.5ᴬ.
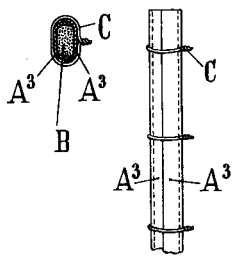 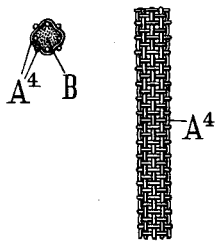
Fig.6.
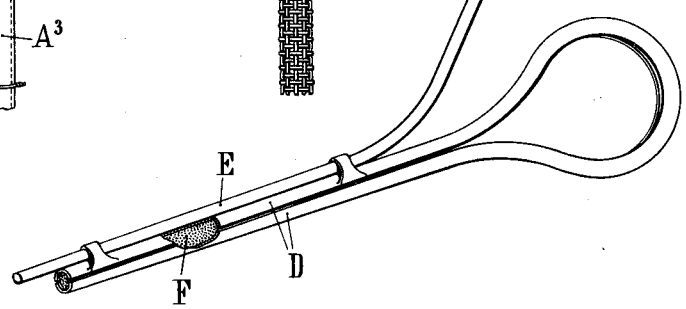
Fig.7.
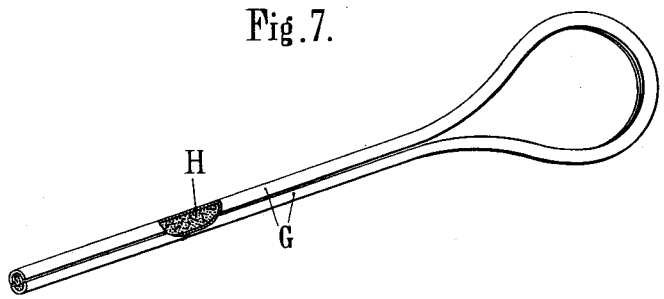
Witnesses:
John Lotka
[signature]
Inventor:
Carl E. Steinweg
By
Briesen & Knauth
Attorneys

UNITED STATES PATENT OFFICE.

CARL EDUARD STEINWEG, OF LÜDENSCHEID, GERMANY.

MEANS FOR SOLDERING ALUMINIUM.

1,052,761. Specification of Letters Patent. Patented Feb. 11, 1913.

Application filed February 9, 1909. Serial No. 477,000.

*To all whom it may concern:*

Be it known that I, CARL EDUARD STEINWEG, a citizen of the German Empire, and resident of Lüdenscheid, Germany, have invented certain new and useful Improvements in Means for Soldering Aluminium, of which the following is a specification.

My invention relates to means for soldering aluminium, consisting in a soldering stick to be used in connection with the soldering of aluminium.

The object of my invention is to provide a soldering stick simple in form and manufacture and of easy application.

In carrying out my invention I use solder consisting of pure aluminium or a rich aluminium alloy in connection with a flux capable of dissolving oxid of aluminium consisting of a composition of elements of different melting and volatilizing points and by melting such flux by indirect heating preferably in a metal receptacle which in a preferred embodiment of the invention is formed by the soldering metal itself.

Therefore the invention consists in a soldering stick, the soldering metal of which contains a high percentage of aluminium in the form of an aluminium oxid dissolving flux mixture in metallic inclosure, said mixture comprising components of different melting and volatilizing points. In connection herewith it is to be understood that by rich aluminium alloy, as I use this term here and in the annexed claims, I mean an alloy which contains more than 75% of aluminium. By using such flux composition which preferably contains chlorids and fluorids, such as sodium chlorid, potassium chlorid and cryolite and by preventing the ingredients of the same from being separated by the influence of overheating, this effect being secured by indirect heating, it becomes possible to secure an efficient solution of the oxid film which always forms on aluminium when exposed to air without causing the flux to form a bar for the light soldering metal to get access to the metal pieces to be joined. Where the soldering metal itself is to be used as a receptacle for the flux, said metal may be formed as a substantially linear body of U-shaped or tubular cross section. This U-shaped, or tubular portion, as the case may be, being filled with the flux, I may, if I desire, without departing from the spirit of my invention, mix the flux and the soldering metal, the latter in comminuted form, together and place them for use in any suitable receptacle adapted to be heated.

In order to accomplish the results aimed at by this invention I preferably employ a soldering stick which contains not only the solder, but the flux also. The new soldering stick may be constructed in a great many different ways, some of which have been shown in the accompanying drawings, in which—

Figure 1 is a longitudinal section of one form of a soldering stick embodying my invention and Fig. 1$^A$ a cross section thereof; Figs. 2 and 2$^A$ are corresponding views of a second form, Figs. 3 and 3$^A$ show a third form, Figs. 4 and 4$^A$ a fourth and Figs. 5 and 5$^A$ a fifth form. In Fig. 6 I have shown a modification in which the container for the flux is different from the soldering metal; Fig. 7 shows a further modification, where a metal container is used which at the same time incloses the flux and solder intermixed with each other.

As shown in Figs. 1 and 1$^A$, the soldering metal A is made in the shape of a tube, preferably of a capillary character and within said tube is contained a flux B in the shape of powder or paste, but preferably in the shape of a very fine powder, the ingredients of which are well mixed. The metal A may be aluminium or an alloy rich in aluminium and the flux may be any one of the approved mixtures of salts. For instance, I may employ the following mixture: 30 parts by weight of cryolite; 35 parts sodium chlorid; 35 parts potassium chlorid. When the lower end of the soldering stick is heated, the flux adjacent to said end will melt, but will be retained in the tubular stock by capillary attraction. In this manner the danger of dissociation is avoided and a uniform melt of the flux will be formed in the interior of the stick. If this stick is then brought into proximity to the joint and heated further, the flux in the interior of this stick will become soft and finally a drop of molten flux will fall on the pieces to be united and at practically the same time a drop of metal will reach the aluminium pieces. In practice the flux may drop on the aluminium a little earlier than the molten solder, but the effect is the same. It will therefore be seen that the flux, at the moment of its activity, has the desired constitution, cleans the joint and gives the soldering metal access to clean metallic surfaces free from oxid; thus in a very simple manner I obtain a perfect soldered joint. This result is obtained not only with large pieces, but with thin pieces of sheet aluminium. Alloys containing aluminium can also be soldered readily in this manner.

The soldering stick shown in Figs. 2 and 2ᴬ comprises a strip of sheet metal A' bent to form a capillary U-shaped channel in which the flux B is contained. In Figs. 3 and 3ᴬ I have shown a spirally wound strip A², forming a tube in which the flux B is contained. Figs. 4 and 4ᴬ show flat strips A³ bound together by wires C and containing the flux between them. In Figs. 5 and 5ᴬ the tube containing the flux B is formed by braided narrow strips or wires A⁴. All of these various forms of my invention are used in the same way as described with reference to Figs. 1 and 1ᴬ.

When it is intended to use the device shown in Fig. 6 a suitable portion of the flux composition is grasped by the tongs D which are slidably mounted on a stick E of aluminium or the like soldering metal, so that the tongs are filled with flux F. Then the system is heated by a flame, while the stick is resting on the metal pieces to be joined which preferably are previously heated. When the melting of solder and flux begins, the stick is drawn along the seam, resulting in a perfect soldering joint.

In the case of using the device of Fig. 7 a mixture of flux composition and solder is grasped by tongs G, so that the tongs are filled with a portion H of same, whereafter the heating and soldering takes place substantially in the same manner as above described.

I claim as my invention:

1. A soldering stick consisting of a substantially linear body of soldering metal consisting of a rich aluminium alloy and a flux composition connected thereto, the flux composition being contained in a metal receptacle and comprising components of different melting and volatilizing points capable of dissolving oxid of aluminium.

2. A soldering stick consisting of a substantially linear body having a large percentage of aluminium and a flux composition connected thereto, the flux composition being contained in a metal receptacle and comprising components of different melting and volatilizing points capable of dissolving oxid of aluminium.

3. A soldering stick consisting of a substantially linear body of soldering metal consisting of rich aluminium alloy forming a receptacle and a flux composition inclosed in said receptacle and comprising components of different melting and volatilizing points capable of dissolving oxid of aluminium.

4. A soldering stick consisting of a substantially linear body having a large percentage of aluminium forming a receptacle and a flux composition inclosed in said receptacle and comprising components of different melting and volatilizing points capable of dissolving oxid of aluminium.

5. A soldering stick consisting of a substantially linear body of soldering metal rich in aluminium, forming a receptacle, a flux composition capable of dissolving aluminium oxid inclosed in said receptacle and comprising components of different melting and volatilizing points, the melting point of the composition approximating that of the soldering metal aforesaid.

In witness whereof I have hereunto set my hand and seal in the presence of two subscribing witnesses.

CARL EDUARD STEINWEG. [L. S.]

Witnesses:
OTTO KÖNIG,
WILHELM FRIEDERICHS.